US010422358B2

(12) United States Patent
Henn et al.

(10) Patent No.: US 10,422,358 B2
(45) Date of Patent: Sep. 24, 2019

(54) METHOD FOR IMPROVING ELECTRO-HYDRAULIC SYSTEM RESPONSE

(71) Applicant: Deere & Company, Moline, IL (US)

(72) Inventors: Grant R. Henn, Dubuque, IA (US); Aaron R. Kenkel, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 141 days.

(21) Appl. No.: 15/798,552

(22) Filed: Oct. 31, 2017

(65) Prior Publication Data

US 2019/0128290 A1    May 2, 2019

(51) Int. Cl.
| | |
|---|---|
| *F15B 13/042* | (2006.01) |
| *F15B 13/044* | (2006.01) |
| *E02F 9/22* | (2006.01) |
| *F16K 31/06* | (2006.01) |
| *F15B 13/043* | (2006.01) |
| *F15B 13/02* | (2006.01) |

(52) U.S. Cl.
CPC .......... *F15B 13/044* (2013.01); *E02F 9/2228* (2013.01); *F15B 13/042* (2013.01); *F15B 13/0433* (2013.01); *F16K 31/0613* (2013.01); *F15B 13/024* (2013.01); *F15B 2211/30525* (2013.01); *F15B 2211/329* (2013.01)

(58) Field of Classification Search
CPC .. F15B 13/043; F15B 13/0433; F15B 21/087; Y10T 137/86582; Y10T 137/8663
See application file for complete search history.

(56) References Cited

U.S. PATENT DOCUMENTS

| | | | | |
|---|---|---|---|---|
| 5,138,838 | A * | 8/1992 | Crosser | F15B 21/087 60/426 |
| 5,251,535 | A * | 10/1993 | Lacher | G05B 19/19 137/625.64 |
| 5,490,384 | A * | 2/1996 | Lunzman | E02F 9/2221 60/327 |
| 6,109,284 | A * | 8/2000 | Johnson | E02F 9/2228 137/1 |
| 6,996,982 | B2 * | 2/2006 | Gray, Jr. | F15B 13/0402 60/413 |
| 7,430,954 | B2 * | 10/2008 | Miura | E02F 9/2292 91/459 |
| 8,567,758 | B2 | 10/2013 | Bouten | |
| 8,678,033 | B2 | 3/2014 | Bengea et al. | |

* cited by examiner

*Primary Examiner* — Michael Leslie
(74) *Attorney, Agent, or Firm* — Taft Stettinius & Hollister LLP; Stephen F. Rost

(57) ABSTRACT

A method for controlling a valve spool that includes providing a control valve having a first end and a second end with a spool disposed therebetween, a hydraulic component, a controller, a first control circuit and a second control circuit, selectively controlling the pressure in the first end and the second end with the controller, identifying an active state, with the controller, and applying an active pressure to both the first end and the second end with the corresponding first control circuit and second control circuit during the active state, and identifying a first command, with the controller, and providing a command pressure to the first end through the first control circuit and a release pressure to the second end through the second control circuit during the first command. Wherein, the spool is moved within the control valve and the hydraulic component is engaged during the first command.

20 Claims, 3 Drawing Sheets

|  | First Control Circuit | Second Control Circuit | Valve Postion |
|---|---|---|---|
| Machine Powered Off | Release | Release | Neutral |
| Machine On: Hydraulics Disabled | Release | Release | Neutral |
| Machine On: Hydraulics Enabled | Active | Active | Neutral |
| Machine On: Hydraulics Enabled, Command A | Command | Release | First Position |
| Machine On: Hydraulics Enabled, Command B | Release | Command | Second Position |

Fig. 3

METHOD FOR IMPROVING ELECTRO-HYDRAULIC SYSTEM RESPONSE

FIELD OF THE DISCLOSURE

The present disclosure relates to an electro-hydraulic valve system, and in particular, to improving the response time of the electro-hydraulic valve system.

BACKGROUND OF THE DISCLOSURE

Many work machines having one or more implement coupled thereto utilize Electro-Hydraulic (hereinafter "EH") control systems. In an EH control system, valve response time effects the controllability of the implement or other hydraulic component. Some valve control delays are caused by user input response delays, controller communication network message rate delays, EH control logic task rate delays, primary control spool response time and valve spool control device response time to name a few. More specifically, many EH systems utilize sensors or the like on an operator input that communicates the position of the operator input to a controller. In turn, the controller sends a signal to a solenoid or the like to reposition a hydraulic valve as indicated by the user input. Ultimately the implement or other hydraulic component will move according to the operator input position. Each one of these steps introduces a lag time that increases the time it takes for the implement to respond to the operator input.

The delay caused by the hydraulic valve is attributed to the rate at which oil can flow through endcaps or the like to fill the cavities that house the primary control spool. In a typical control valve, the spool is normally centered in a cavity and shifted one of two directions in order to pass flow to the implement or other hydraulic device. Many EH systems utilize a hydraulic valve that has two spool control devices used to drive a valve spool in either of two directions. These devices are typically energized one at a time in order to actuate the valve spool in a given direction. When an actual spool command is requested, one spool control device is energized to transition the valve spool to the corresponding position.

SUMMARY

One embodiment is a method for controlling a valve spool that includes providing a control valve having a first end and a second end with a spool disposed therebetween, a hydraulic component fluidly coupled to the control valve, a controller, a first control circuit selectively fluidly coupled to the first end of the control valve, and a second control circuit selectively fluidly coupled to the second end of the control valve, selectively controlling the pressure in the first end and the second end with the controller, identifying an active state, with the controller, and applying an active pressure to both the first end and the second end with the corresponding first control circuit and second control circuit during the active state, and identifying a first command, with the controller, and providing a command pressure to the first end through the first control circuit and a release pressure to the second end through the second control circuit during the first command. Wherein, the spool is moved within the control valve and the hydraulic component is engaged during the first command.

In one example, the first and second control circuits are hydraulic circuits that selectively provide hydraulic fluid to the first end and the second end. One aspect of this example includes a first pressure relief valve on the first end and a second pressure relief valve on the second end. In yet another aspect of this example, the first and second pressure relief valve are selectively controlled by the controller to provide hydraulic fluid to the corresponding first and second end at the active pressure, command pressure, or the release pressure.

Another example includes storing a hydraulic component engagement pressure in the controller, wherein the hydraulic component engagement pressure is the pressure required in one of the first end or the second end to move the spool to engage the hydraulic component when the other of the first end or the second end has the release pressure. In one aspect of this example, the active pressure is less than the hydraulic component engagement pressure.

Yet another example includes a hydraulic assembly having an enabled state and a disabled state, wherein when the hydraulic assembly is in the enabled state the controller applies the active pressure. In one aspect of this example, the controller does not apply the active pressure when the hydraulic assembly is in the disabled state.

Another example includes a first pressure relief valve on the first end and a second pressure relief valve on the second end wherein the first and second pressure relief valves are controlled through the controller by a corresponding first and second solenoid. One aspect of this example includes storing an active pressure current, a command pressure current, and a release pressure current in the controller, wherein the active pressure current is the current required to position the first or second solenoid to provide the active pressure through the corresponding first or second pressure relief valve, the command pressure current is the current required to position the first or second solenoid to provide the command pressure through the corresponding first or second pressure relief valve, and the release pressure current is the current required to position the first or second solenoid to provide the release pressure through the corresponding first or second pressure relief valve.

Another embodiment is a hydraulic valve system having a user input with a first position and a second position, a hydraulic component, a control valve having a first end and a second end, the control valve selectively coupling the hydraulic component to a hydraulic source, a first hydraulic control circuit selectively fluidly coupled to the first end through a first valve, a second hydraulic control circuit selectively fluidly coupled to the second end through a second valve, a spool positioned in the control valve between the first end and the second end, the spool being positionable in a first position, a second position, and a neutral position within the control valve. Wherein, the first and second valves provide an active pressure to the first end and the second end when the hydraulic valve system is in an active state.

In one example of this embodiment, the first valve provides a command pressure to the first side when the user input moves from the first position to the second position, the command pressure being greater than the active pressure.

In another example, the second valve provides a release pressure to the second side when the user input moves from the first position to the second position, the release pressure being less than the active pressure.

In yet another example, the first valve provides a command pressure to the first side and the second valve provides a release pressure to the second side when the user input moves from the first position to the second position, the command pressure being greater than the active pressure and the release pressure being less than the active pressure.

One example includes at least one centering member coupled to the spool, wherein the centering member positions the spool in the neutral position when no pressure is provided in the first end or the second end. In one aspect of this example, the active pressure is insufficient to transition the valve into the first position or the second position.

Another embodiment is a method for controlling a control valve coupled to a hydraulic component on a work machine, the method including providing a user input having an engaged position and a disengaged position, a spool having at least a neutral position and an active position and located between a first end and a second end of the control valve, a first valve selectively fluidly coupling the first end to a hydraulic control circuit, a second valve selectively fluidly coupling the second end to the hydraulic control circuit, and a controller operably controlling the first and second valves, storing, in the controller, an active value, a release value, and a command value, wherein each value corresponds with a pressure generated in the first end or second end and acting on the spool, identifying an active state of the work machine, with the controller, and applying the active value to both the first end and the second end through the first valve and second valve when the user input is in the disengaged position, applying the command value to the first end and the release value to the second end when the work machine is in the active state and the user input is in the engaged position to transition the spool from the neutral position to the active position. Wherein, when the work machine is in the active state and the user input is in the disengaged position, the spool is maintained in the neutral position.

In one example of this embodiment, the pressure in the first and second ends during the active value is greater than 0 pounds per square inch relative to a surrounding atmospheric pressure.

In another example, the pressure provided to the first end during the active value does not transition the spool from the neutral position to the active position when the second end is at the active value or the release value.

Yet another example includes providing an inlet port and an exhaust port in each of the first end and the second end, wherein the exhaust port is larger than the inlet port.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3 is an exemplary table identifying control circuit values as they correlate to a machine state.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
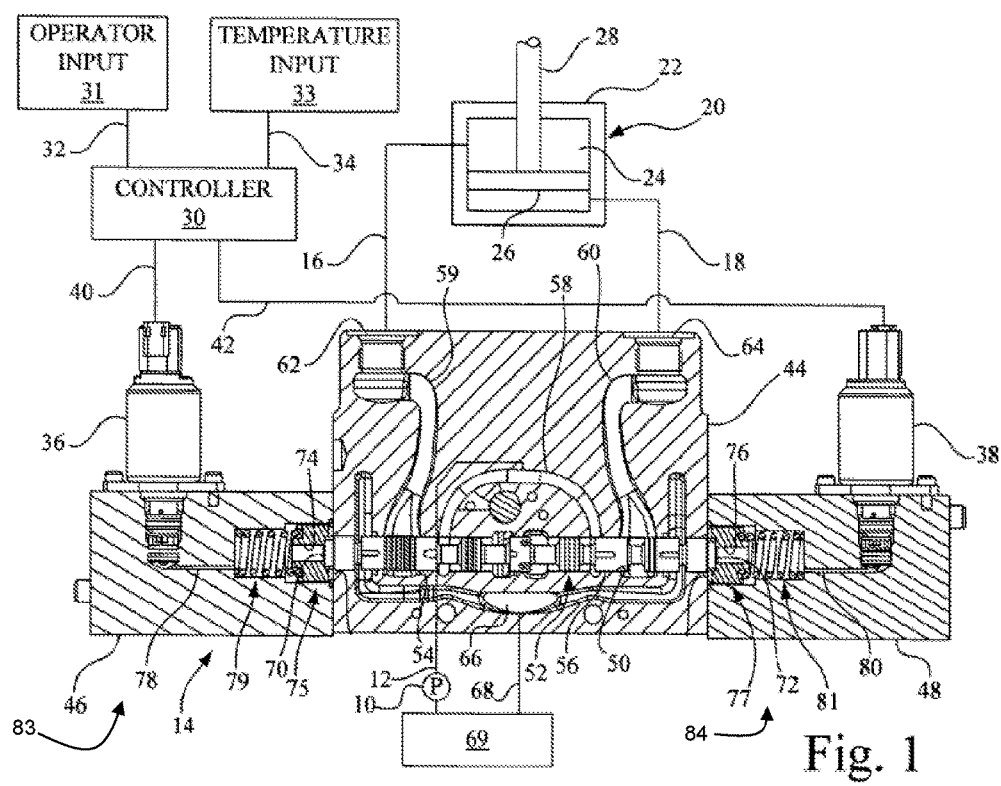
FIG. 1 is a longitudinal cross-section of a valve according to one embodiment, along with schematic elements of a hydraulic system with which the valve element is used.

Referring to FIG. 1, one non-exclusive example of a hydraulic system is illustrated. More specifically, there is shown a hydraulic system comprising a pump 10 for hydraulic fluid having a high pressure feed line 12 extending to a control valve generally indicated by reference character 14. Control valve 14 selectively directs pressurized fluid through outlet conduits 16 and 18 to an actuator 20 or other hydraulic component. In this non-limiting example, the actuator 20 comprises a housing 22 forming a chamber 24 in which a piston 26 reciprocates. Piston 26 is connected to an output shaft 28 so that displacement of piston 26 within chamber 24 causes the output shaft 28 to linearly displace. Pressurized hydraulic fluid in the conduits 16 and 18 act on opposite sides of piston 26 to control the displacement of the output shaft 28. Although a linearly displaceable actuator 20 is illustrated, it should be apparent to those skilled in the art that many different forms of hydraulically actuated devices or other hydraulic components may be employed with the present disclosure.

The control of valve 14 is provided by controller 30 that receives operator input 31 from line 32 and optionally a temperature input 33 from line 34. It is also possible to provide other control inputs, e.g. engine load as will be apparent to those skilled in the art. Controller 30, as illustrated, generates electrical outputs to be fed to linear electrical solenoid valves 36 and 38 through lines 40 and 42, respectively. The solenoid valves 36 and 38 function to control direction of fluid through conduits 16 and 18 as will be described below.

Valve assembly 14 comprises a central housing 44 to which solenoid valve housings 46 and 48 are secured by appropriate fasteners on opposing first and second ends 83, 84 of the central housing 44. Central housing 44 has a longitudinal bore 50 in which a spool valve 52 is positioned for displacement in an axial direction. Spool valve 52 has a series of lands that enable particular functions of the spool valve 52 to be achieved. A pair of lands 54 and 56 cooperates with high pressure passage 58 to selectively direct pressurized fluid from line 12 past the lands 54 and 56 to passages 59 and 60. Passages 59 and 60 connect to outlets 62 and 64 which in turn connect to conduits 16 and 18. The spool valve 52 has a sump chamber 66 connected to a return line 68 leading to pump 10 through reservoir 69. It should be apparent to those skilled in the art that typically the pump would include a reservoir and tank 69 to supply hydraulic fluid to pump 10.

The spool valve element 52 has end faces 70 and 72 which are acted on by pressure in bores 74 and 76 to apply pressurized fluid to the end faces 70 and 72 thus displacing the spool valve element 52 longitudinally in a first direction towards the first end or in a second direction towards the second end. Fluid is directed to conduits 16 or 18 depending on the positioning of the spool valve element 52. The bores 74 and 76 are supplied with control fluid through passages 78 and 80 in housings 46, 48 leading from solenoid valves 36 and 38, respectively. Bores 74 and 76 are formed in valve seats 75 and 77 that abut the end faces 70 and 72 of valve element 52. Centering members or springs 79 and 81 resist movement of valve element 52 from the illustrated neutral position.

Solenoid valves 36 and 38 receive electrical signals from controller 30 via lines 40 and 42 to direct pressurized fluid from a corresponding first or second control circuit to end faces 70 and 72 to thus displace spool valve element 52 longitudinally. Solenoid valves 36 and 38 can be anyone of a number of valves useful in the present combination. They are illustrated as proportional solenoid valves so that the pressure in passages 78 and 80, and thus in bores 74 and 76 and applied to first and second end faces 70, 72, can be varied. In another embodiment, the solenoid valves 36 and 38 may be pressure relief valves electronically controlled by the controller 30.

The first solenoid valve 36 and corresponding passage 78 may be part of the first control circuit configured to alter the pressure provided to the first end face 70 of the spool valve 52 on the first end 83. Similarly, the second solenoid valve 38 and corresponding passage 80 may be part of a second control circuit configured to alter the pressure provided to the second end face 72 of the spool valve 52 on the second end 84. In one non-exclusive example, the first and second control circuits may be fluidly coupled to the same hydraulic source such as the pump 10 and reservoir 69. However, in other examples the first and second control circuits may be fluidly coupled to a dedicated hydraulic control source.

Regardless of the source, the first control circuit selectively provides hydraulic fluid to the first end face 70 through the first solenoid valve 36 and the second control circuit selectively provides hydraulic fluid to the second end face 72 through the second solenoid valve 38. If the pressure provided to the first end face 70 through the first control circuit is sufficiently greater than the pressure provided to the second end face 72 through the second control circuit, the spool valve 52 will move axially within the longitudinal bore 50 to a first position to fluidly couple the high pressure feed line 12 to the actuator 20 or other hydraulic component. Similarly, pressure may be provided to the second end face 72 through the second control circuit that is sufficiently greater than the pressure provided to the first end face 70 through the first control circuit to move the spool valve 52 axially within the longitudinal bore 50 to a second position to fluidly couple the high pressure feed line 12 to the actuator 20 or other hydraulic component in a functionally opposite manner as when the first control circuit provides a higher pressure.

Figure 2:
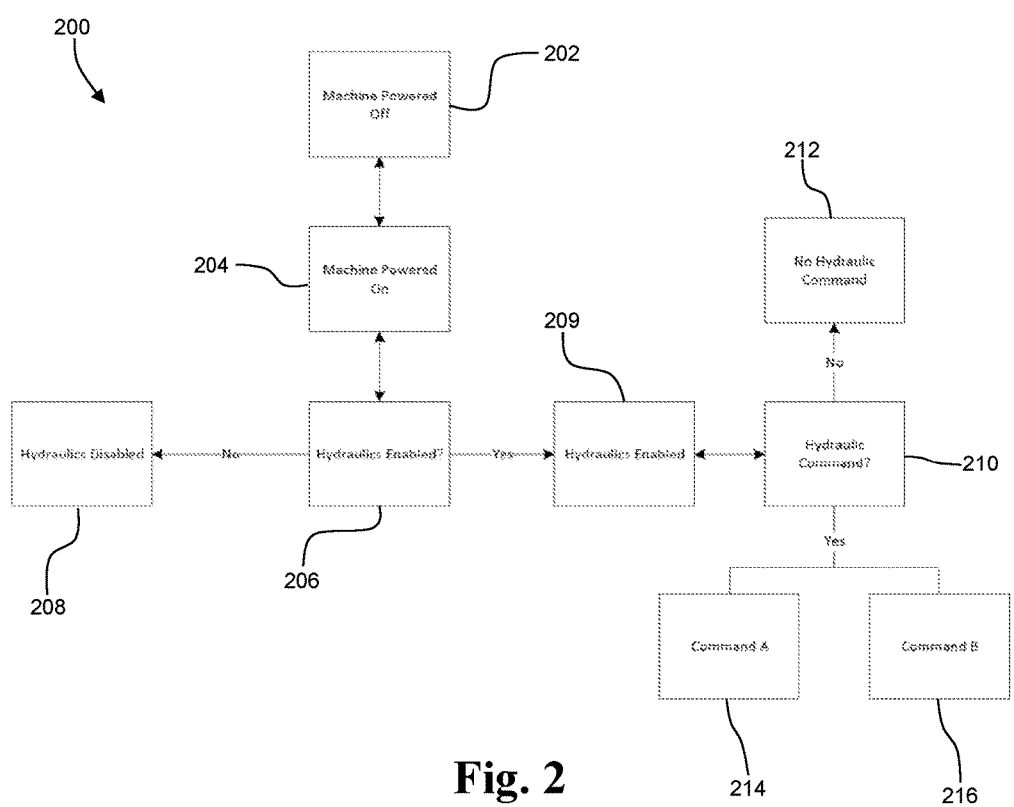
FIG. 2 is a logic flowchart for an EH control system.

Referring now to FIG. 2, a control system 200 diagram is illustrated. The control system 200 may be one non-exclusive example of a method to control the control valve 14 described above. The control system 200 may be utilized on any work machine having an electro-hydraulic system or the like and is not limited to any particular application. Further, the controller 30 may implement the logic explained herein for the control system 300 to shorten the actuator 20 or hydraulic component response time when the controller 30 identifies an operator input 31.

FIG. 3 illustrates a table 300 that coincides with the control system 200 of FIG. 2. More specifically, the table 300 has a machine state column 302 showing a non-exclusive list of potential machine states identified in the control system 200. A first control circuit column 304 illustrates the state of the first control circuit based on the machine state 302. Similarly, a second control circuit column 306 illustrates the state of the second control circuit based on the machine state 302. A valve position column 308 identifies the position of the spool valve 52 based on the first and second control circuit values 304, 306.

The first and second control circuit columns 304, 306 may have a release state, an active state, or a command state. The release state may be a state that correlates with a release pressure where the corresponding solenoid valves 36, 38 are fluidly coupling the corresponding end faces 70, 72 of the spool 52 to an exhaust circuit or reservoir 69. The active state may be where the corresponding solenoid valves 36, 38 are providing an active pressure to the respective first end face 70 and second end face 72 of the spool valve 52. Further, the command state may be where the corresponding solenoid valves 36, 38 are providing a command pressure or command pressure range to the respective first end face 70 and second end face 72 of the spool valve 52.

In one non-exclusive example, the active pressure provided during the active state may be a pressure greater than atmospheric pressure but less than a pressure required to reposition the spool valve 52 sufficiently to engage or otherwise fluidly couple the actuator 20 or hydraulic component to the high pressure feed line 12 when there is no pressure acting on the opposing end. More specifically, the spool valve 52 may be maintained in a neutral position or position range between the first end 83 and the second end 84 by the springs 79, 81. In the neutral position range, the actuator 20 may not be fluidly coupled to the high pressure feed line 12 because of the position of the spool valve 52. However, when sufficient pressure is provided to the first end face 70 or the second end face 72 the spring force holding the spool valve 52 in the neutral position range may be overcome, and the spool valve 52 may slide axially within the longitudinal bore 50 to the first position or the second position and fluidly couple the actuator 20 or other hydraulic device to the high pressure feed line 12. Accordingly, the active pressure may be a pressure that is insufficient to overcome the springed force on the spool valve 52 and fluidly couple the actuator 20 or other hydraulic component to the high pressure feed line 12.

In one example, the pressure required to be applied to the first or second end face 70, 72 to overcome the spring force holding the spool valve 52 in the neutral position range may be stored in the controller 10 as the hydraulic component engagement pressure. As described above, the controller 10 may check that the active pressure is less than the hydraulic component engagement pressure.

In other words, the hydraulic component engagement pressure may be the pressure required in either the first end 83 or the second end 84 to sufficiently move the spool valve 52 to fluidly couple the actuator or other hydraulic component to the high pressure feed line 12. By setting the active pressure lower than the hydraulic component engagement pressure, when the active pressure is provided to one of the first end face 70 or the second end face 72 and the opposing end face 70, 72 has no pressure applied thereto, the spool valve 52 will not move out of the neutral position range. This configuration may ensure the actuator 20 or other hydraulic component will not be fluidly coupled to the high pressure feed line 12 when the controller 30 places the first and second solenoid valves 36, 38 in the active state and one of the solenoid valves 36, 38 does not timely respond. In other words, if the controller 30 places both solenoid valves 36, 38 in the active state, but one of the solenoid valves 36, 38 remains fluidly coupled to the reservoir 69 thereby applying no pressure to the corresponding end face 70, 72, the spool valve 52 will remain within the neutral position range.

The active pressure may be a preset value stored in the controller 30 or a learned value. Further, the active pressure may be an active current value stored in the controller. The active current may be the electrical current provided to the corresponding solenoid valves 36, 38 that result in the active pressure. In other words, the solenoid valves 36, 38 may provide the active pressure through the corresponding first and second control circuit to the first and second end faces 70, 72 when the active current value is provided thereto.

In one non-exclusive example, the command pressure provided during the command state may be a pressure or pressure range greater than hydraulic component engagement pressure. In other words, the command pressure may be a pressure value or range provided to the first end face 70 or the second end face 72 to overcome the spring force holding the spool valve 52 in the neutral position range. When the command pressure or range is provided to one of the end faces 70, 72 and the release pressure is provided to the other end face 70, 72, the spool valve 52 may slide axially within the longitudinal bore 50 sufficiently far to fluidly couple the actuator 20 or other hydraulic device to the high pressure feed line 12. Accordingly, the command pressure may be a pressure that is sufficient to overcome the springed force on the spool valve 52 to fluidly couple the actuator 20 or other hydraulic component to the high pressure feed line 12.

The command pressure may also be a preset value or range of values stored in the controller 30 or a learned value. Further, the command pressure may be a command current value or current value range stored in the controller. The command current or current range may be the electrical current provided to the corresponding solenoid valves 36, 38 that result in the command pressure or command pressure range. In other words, the solenoid valves 36, 38 may provide the command pressure through the corresponding first and second control circuit to the first and second end face 70, 72 when the command current value is provided thereto.

In one non-exclusive example, the release pressure provided during the release state may be a pressure consistent with or close to atmospheric pressure. In other words, the release pressure may correlate with the corresponding first or second control circuit being fluidly coupled to the reservoir 69 or otherwise vented to the surrounding atmosphere. The release pressure may be a pressure value provided to the first end face 70 or the second end face 72 to allow the spool valve 52 to move axially towards that end, thereby displacing hydraulic fluid out of the corresponding first or second end 83, 84. When the release pressure is provided to one of the end faces 70, 72 and the command pressure is provided to the other end face 70, 72, the spool valve 52 may slide axially within the longitudinal bore 50 to the first or second position, thereby fluidly coupling the actuator 20 to the high pressure feed line 12. Accordingly, the release pressure may be a pressure that is low enough to allow the spool valve 52 to fluidly couple the actuator 20 or other hydraulic component to the high pressure feed line 12 when the command pressure is provided to the opposing end of the spool 52.

The release pressure may also be a preset value stored in the controller 30 or a learned value. Further, the release pressure may be a release current value stored in the controller. The release current may be the electrical current provided to the corresponding solenoid valve 36, 38 that result in the release pressure. In other words, the solenoid valve 36, 38 may provide the release pressure through the corresponding first and second control circuit to the first and second end faces 70, 72 when the release current value is provided thereto. In one non-exclusive example, the corresponding first and second ends 83, 84 may be fluidly coupled to the reservoir 69 or otherwise exhausted to atmosphere when no current is provided to the corresponding solenoid valve 36, 38.

While the active pressure is described herein as being a pressure that is insufficient to overcome the spring force on the spool valve 52, other embodiments may have a greater active pressure. More specifically, the spool valve 52 may be a substantially rigid component spaced between the first end face 70 and the second end face 72. Accordingly, the acting pressure on the spool valve 52 is the difference between the pressure provided to the first end face 70 and the pressure provided to the second end face 72. For example, if the first hydraulic circuit provides three-hundred (300) pounds of pressure per square inch (hereinafter "PSI") to the first end face 70 and the second hydraulic circuit provides two-hundred and fifty (250) PSI to the second end face 72, the acting pressure on the spool valve 52 may be fifty (50) PSI on the first end face 70. Accordingly, this embodiment may have an active pressure that is any pressure as long as the active pressure is applied equally to both the first and second end face 70, 72.

Similarly, the release pressure and command pressure may be any pressure as long as the difference between the two is high enough to transition the spool valve 52 from the neutral position range to the first or second position. In one example, the release pressure may be the same as the active pressure and the command pressure can be significantly greater than the active pressure. Alternatively, in another embodiment, the command pressure may be the same as the active pressure and the release pressure may be significantly lower than the active pressure. A person skilled in the art understands that the difference in the pressure acting on first end face 70 and the second face 72 causes the spool valve 52 to move axially within the longitudinal bore 50 and many different pressure combinations between the first end face 70 and the second end face 72 are considered herein.

Referring back to FIG. 2, in a first scenario the controller 30 may identify that the work machine is powered off 202. The controller 30 may identify an operator input 31 indicating that the user does not intend to operate the work machine of the control system 200. In one non-exclusive example the operator input 31 may be an ignition switch or the like. When the switch is turned to an off position, the controller 30 identifies the user does not intend to use the work machine any longer. As shown in the table 300, when the machine is powered off 202, the first control circuit and the second control circuit are in the release state. As described above, the release state may be when no current is provided to the solenoid valves 36, 38 and no pressure is provided to the first end face 70 or the second end face 72. Accordingly, when the controller identifies that the machine is powered off 202, the release pressure is applied to the first and second end faces 70, 72 of the spool valve 52 and the spool valve remains in the neutral position range.

The controller 30 may also identify when the work machine is powered on 204. The work machine powered on 204 may be identified by an operator input indicating the work machine is going to be used such as an ignition switch being turned to an on position or the like. The controller 30 may then determine whether the hydraulic system is enabled 206 before the controller 30 alters the first or second control circuits 304, 306. An operator input may be communicated to the controller 30 to identify when the user intends to use the hydraulic system. The operator input may be a toggle switch or other switch or sensor that indicates to the controller 30 that the hydraulic system is engaged.

If the user input identifies that the hydraulics are disabled, the controller 30 enters a machine on hydraulics disabled 208 state. In the machine on hydraulics disabled state 208 both the first and second control circuits may be in the release state. Similar to the machine powered off state 202, in the machine on hydraulics disabled 208 state the spool valve 52 remains in the neutral position range and the actuator 20 or other hydraulic component remains fluidly isolated from the high pressure feed line 12.

However, if the controller 30 identifies that the hydraulics are enabled, the controller may enter a hydraulics enabled state 209 where both the first and second control circuits 304, 306 are transitioned from the release state to the active state. Next, the controller will look for a hydraulic command 210. In one non-limiting example, the hydraulic command 210 may be an operator input 31 indicating the user intends to manipulate a work tool or other implement. If the controller 30 determines that the hydraulics are enabled 206 but there is no hydraulic command 212, the controller 30 may maintain both the first and second control circuits 304, 306 in the active state. More specifically, when the controller 30 identifies that the hydraulic are on but there is no command 212, the controller 30 prepares the control valve 14 for quickly executing a command by providing the active pressure to both the first and second end faces 70, 72.

If the controller 30 does identify a hydraulic command, the controller 30 may identify whether it is a command A 214 or a command B 216 as it applies to the control valve 14. If the controller identifies that the hydraulics are on, and there is a command A 214, the controller 30 may transition the first control circuit to the command state proportional to the operator input 31 and the second control circuit to the release state. When the first hydraulic circuit is providing the command pressure to the first end face 70 and the second hydraulic circuit is providing the release pressure to the second end face 72 during the command A 214, the spool valve 52 may be displaced to the first position to a proportional extent of the operator input 31 within the longitudinal bore 50 towards the second side. When the spool valve 52 is in the first position, the actuator 20 or other hydraulic component may be fluidly coupled to the high pressure feed line 12 via one of the outlet conduits 16, 18.

Similarly, if the controller identifies that the hydraulics are on, and there is a command B 216, the controller 30 may transition the first control circuit to the release state and the second control circuit to the command state proportional to the operator input 31. When the first hydraulic circuit is providing the release pressure to the first end face 70 and the second hydraulic circuit is providing the command pressure to the second end face 72 during the command B 216, the spool valve 52 may be displaced to the second position to a proportional extend of the operator input 31 within the longitudinal bore 50 towards the first side. When the spool valve 52 is in the second position, the actuator 20 or other hydraulic component may be fluidly coupled to the high pressure feed line 12 via one of the outlet conduits 16, 18 opposite of the outlet conduit 16, 18 coupled to the high pressure feed line 12 when the spool valve 52 is in the second position.

While one control valve 14 is described in detail herein, this disclosure is not limited to one control valve and the teachings of this disclosure apply equally to hydraulic systems with multiple control valves. More specifically, the controller 30 may send instructions to several control valves responsive to a single operator input to achieve a desired work tool function. Further, when the hydraulics are enabled, multiple control valves may be positioned in different states depending on the operator input. More specifically, all of the control valves in a hydraulic system may be transitioned to the active state when the hydraulics are enabled but only a select few of the control valves may transition to the command and release state depending on the operator input.

In one aspect of this disclosure, the control system 200 provides an increased response time for an electro-hydraulic system by providing the active pressure to the corresponding first and second end face 70, 72 when the hydraulic are enabled 206. By providing the active pressure to the first and second end face 70, 72, the response time for fluidly coupling the actuator 20 to the high pressure feed line during the command 214, 216 is reduced. More specifically, the spool valve 52 requires at least some pressure applied to either the first end face 70 or the second end face 72 to transition the spool valve 52 to the first or second position. By providing the active pressure to the respective end faces 70, 72 when the hydraulics are enabled, the command pressure is more quickly achieved in the corresponding first or second control circuit during the command 214, 216. In one non-limiting example, the spool valve 52 is more quickly moved to the first or second position because the pressure applied to one of the end faces 70, 72 is increased while the pressure applied to the opposing end face 70, 72 is simultaneously reduced.

In one non-limiting example, the command pressure may be four-hundred (400) PSI and the active pressure may be three-hundred (300) PSI. In this example, the corresponding control circuit has to raise the pressure applied to the first or second end face 70, 72 by one-hundred (100) PSI to achieve the desired command pressure. However, if a control system does not implement the active pressure prior to initiating the command pressure, the corresponding control circuit has to raise the pressure applied to the first or second end face 70, 72 by four-hundred (400) PSI to achieve the desired command pressure. Under identical hydraulic conditions (similar flow rates, pressures, viscosity, and the like), the control system utilizing the active pressure will transition the spool valve 52 to the desired position faster than a control system that does not implement an active pressure. The faster repositioning of the spool valve 52 results in a faster engagement of the actuator 20 or other hydraulic component.

Similarly, one embodiment considered herein may have an active pressure and a command pressure that are both about four-hundred (400) PSI. In this embodiment, the release pressure may be zero (0) PSI or otherwise fluidly coupled to reservoir 69 or atmosphere. When the command A 214 or command B 216 are identified by the controller 30, the corresponding first or second control circuit 304, 306 will apply the release pressure. Once the corresponding control circuit 304, 306 reaches the release pressure, the high active pressure of the other control circuit 304, 306 causes the spool valve 52 to transition to the respective first or second position, thereby fluidly coupling the actuator 20 to the high pressure feed line 12. In this embodiment, the solenoid valves 36, 38 may have enlarged exhaust ports defined therein. When the solenoid valves 36, 38 are in the release position, they may be fluidly coupling the corresponding first or second end 83, 84 to the reservoir 69 or atmosphere through the enlarged exhaust ports. Accordingly, the enlarged exhaust ports allow any fluid positioned therein to be quickly exhausted during a release command.

In one aspect of the above embodiment, the enlarged exhaust ports may allow for a greater flow rate than the control circuits 304, 306 can provide to the corresponding first and second end 83, 84. Accordingly, by setting the active pressure to the command pressure, the spool valve 52 response time may be improved compared to a system that does not provide any active pressure to the control circuits 304, 306.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for controlling a valve spool, comprising:
providing a control valve having a first end and a second end with a spool disposed therebetween, a hydraulic component fluidly coupled to the control valve, a controller, a first control circuit selectively fluidly coupled to the first end of the control valve, and a second control circuit selectively fluidly coupled to the second end of the control valve;
selectively controlling the pressure in the first end and the second end with the controller;
identifying an active state, with the controller, and applying an active pressure to both the first end and the second end with the corresponding first control circuit and second control circuit during the active state; and
identifying a first command, with the controller, and providing a command pressure to the first end through the first control circuit and a release pressure to the second end through the second control circuit during the first command;
wherein, the spool is moved within the control valve and the hydraulic component is engaged during the first command.

2. The method for controlling a valve spool of claim 1, further wherein the first and second control circuits are hydraulic circuits that selectively provide hydraulic fluid to the first end and the second end.

3. The method for controlling a valve spool of claim 2, further comprising a first pressure relief valve on the first end and a second pressure relief valve on the second end.

4. The method for controlling a valve spool of claim 3, further wherein the first and second pressure relief valve are selectively controlled by the controller to provide hydraulic fluid to the corresponding first and second end at the active pressure, command pressure, or the release pressure.

5. The method for controlling a valve spool of claim 1, further comprising storing a hydraulic component engagement pressure in the controller, wherein the hydraulic component engagement pressure is the pressure required in one of the first end or the second end to move the spool to engage the hydraulic component when the other of the first end or the second end has the release pressure.

6. The method for controlling a valve spool of claim 5, further wherein the active pressure is less than the hydraulic component engagement pressure.

7. The method for controlling a valve spool of claim 1, further comprising a hydraulic assembly having an enabled state and a disabled state, wherein when the hydraulic assembly is in the enabled state the controller applies the active pressure.

8. The method for controlling a valve spool of claim 7, further wherein the controller does not apply the active pressure when the hydraulic assembly is in the disabled state.

9. The method for controlling a valve spool of claim 1, further comprising a first pressure relief valve on the first end and a second pressure relief valve on the second end wherein the first and second pressure relief valves are controlled through the controller by a corresponding first and second solenoid.

10. The method of controlling a valve spool of claim 9, further comprising storing an active pressure current, a command pressure current, and a release pressure current in the controller, wherein the active pressure current is the current required to position the first or second solenoid to provide the active pressure through the corresponding first or second pressure relief valve, the command pressure current is the current required to position the first or second solenoid to provide the command pressure through the corresponding first or second pressure relief valve, and the release pressure current is the current required to position the first or second solenoid to provide the release pressure through the corresponding first or second pressure relief valve.

11. A hydraulic valve system, comprising:
a user input having a first position and a second position;
a hydraulic component;
a control valve having a first end and a second end, the control valve selectively coupling the hydraulic component to a hydraulic source;
a first hydraulic control circuit selectively fluidly coupled to the first end through a first valve;
a second hydraulic control circuit selectively fluidly coupled to the second end through a second valve;
a spool positioned in the control valve between the first end and the second end, the spool being positionable in a first position, a second position, and a neutral position within the control valve;
wherein, the first and second valves provide an active pressure to the first end and the second end when the hydraulic valve system is in an active state.

12. The hydraulic valve system of claim 11, further wherein the first valve provides a command pressure to the first side when the user input moves from the first position to the second position, the command pressure being greater than the active pressure.

13. The hydraulic valve system of claim 11, further wherein the second valve provides a release pressure to the second side when the user input moves from the first position to the second position, the release pressure being less than the active pressure.

14. The hydraulic valve system of claim 11, further wherein the first valve provides a command pressure to the first side and the second valve provides a release pressure to the second side when the user input moves from the first position to the second position, the command pressure being greater than the active pressure and the release pressure being less than the active pressure.

15. The hydraulic valve system of claim 11, further comprising at least one centering member coupled to the spool, wherein the centering member positions the spool in the neutral position when no pressure is provided in the first end or the second end.

16. The hydraulic valve system of claim 15, further wherein the active pressure is insufficient to transition the valve into the first position or the second position.

17. A method for controlling a control valve coupled to a hydraulic component on a work machine, comprising:
providing a user input having an engaged position and a disengaged position, a spool having at least a neutral position and an active position and located between a first end and a second end of the control valve, a first valve selectively fluidly coupling the first end to a hydraulic control circuit, a second valve selectively fluidly coupling the second end to the hydraulic control circuit, and a controller operably controlling the first and second valves;

storing, in the controller, an active value, a release value, and a command value, wherein each value corresponds with a pressure generated in the first end or second end and acting on the spool;

identifying an active state of the work machine, with the controller, and applying the active value to both the first end and the second end through the first valve and second valve when the user input is in the disengaged position;

applying the command value to the first end and the release value to the second end when the work machine is in the active state and the user input is in the engaged position to transition the spool from the neutral position to the active position;

wherein, when the work machine is in the active state and the user input is in the disengaged position, the spool is maintained in the neutral position.

18. The method of controlling the control valve from claim 17, further wherein the pressure in the first and second ends during the active value is greater than 0 pounds per square inch relative to a surrounding atmospheric pressure.

19. The method of controlling the control valve from claim 17, further wherein the pressure provided to the first end during the active value does not transition the spool from the neutral position to the active position when the second end is at the active value or the release value.

20. The method of controlling the control valve from claim 17, further comprising providing an inlet port and an exhaust port in each of the first end and the second end, wherein the exhaust port is larger than the inlet port.

* * * * *